United States Patent [19]
Van Hook

[11] 4,009,523
[45] Mar. 1, 1977

[54] ACOUSTIC SIGNATURE SIMULATION

[75] Inventor: Jack K. Van Hook, Orlando, Fla.

[73] Assignee: The United States of America as represented by the Secretary of the Navy, Washington, D.C.

[22] Filed: Dec. 15, 1958

[21] Appl. No.: 780,638

[52] U.S. Cl. .............................. 35/10.4; 340/384 E
[51] Int. Cl.² .......................................... G08B 3/00
[58] Field of Search ...................... 333/76; 324/100;
340/15, 384, 3, 384 R, 384 E; 35/10.4;
102/18, 19.2

[56] References Cited
UNITED STATES PATENTS

| | | | |
|---|---|---|---|
| 2,368,953 | 2/1945 | Walsh | 102/18 X |
| 2,894,245 | 7/1959 | Johnson | 340/15 |

Primary Examiner—Malcolm F. Hubler
Attorney, Agent, or Firm—William O. Quesenberry; Rolla N. Carter; Louis A. Miller

EXEMPLARY CLAIM

1. The method of producing an electric signal corresponding to the underwater acoustic signature which would be generated by the movement of a certain sound source through a remote underwater environment which comprises preparing a recording at a substantially constant signal level of the acoustic output of said certain sound source in deep water far from shore, preparing a series of curves of the transmission characteristics of said remote environment for sound in selected consecutive frequency bands as a function of distance from said source, reproducing the constant level recording as electrical waves, separating the reproduced electrical waves into said selected consecutive frequency bands, modulating the amplitude of the electrical waves in each frequency band in accordance with the corresponding sound transmission characteristic curve, and combining the modulated electrical waves.

3 Claims, 2 Drawing Figures

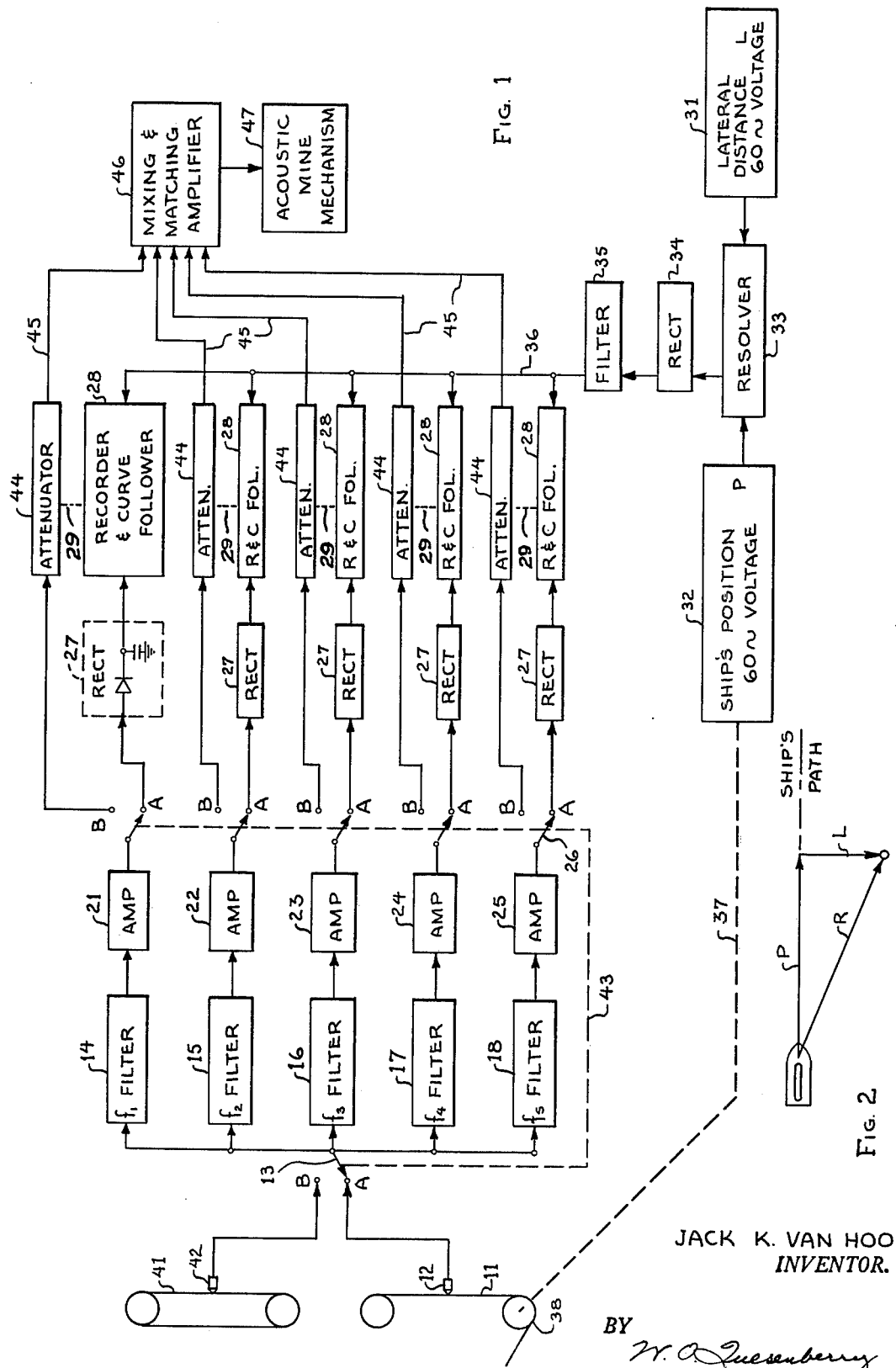

ACOUSTIC SIGNATURE SIMULATION

The invention described herein may be manufactured and used by or for the Government of the United States of America for governmental purposes without the payment of any royalties thereon or therefor.

The present invention relates to simulators and more particularly to an electromechanical acoustic simulator. More specifically the invention is directed to a method and apparatus for determining the response of acoustic mine mechanisms to combinations of ships and sweeps and for determining the vulnerability of a minesweeper as it passes over an acoustic mine field. U.S. Pat. No. 2,396,699 to Hayes et al., discloses a tuned acoustic detecting device which operates on a strength or intensity of signal received from a passing ship for controlling the detonation of a mine.

The primary object of the invention is the provision of means to produce for laboratory testing of acoustic influence mines the simulated sound field incident upon an acoustic mine on the ocean bottom which is generated by a ship or an acoustic sweep gear as it passes by a mine field.

In preparing for and during acoustic mine warfare it is highly desirable to know the operating characteristics of the mine mechanisms, their threat to shipping, and the effectiveness to sweep gear against them. To obtain the desired information directly in the field would entail the accurate planting of a mine, precise navigation, many passes at different speeds and at different lateral distances from the mine, and complicated instrumentation all of which are time consuming, laborious andd expensive. Furthermore, with respect to an enemy mine (only one may be available) it is imperative that its characteristics be determined in the shortest time possible so that countermeasures may be devised. When it is remembered that different harbor areas possess different sound transmission characteristics especially in the frequency region utilized by most acoustic mines, i.e., below 1000 cps, the need for a laboratory technique becomes apparent.

In accordance with the preferred embodiment of the invention a series of curves representative of the sound transmission characteristics of a particular harbor area for a number of different frequency bands are prepared. These curves are then employed in curve followers to attenuate the same frequency bands derived from the playback of a free field recording of an acoustic sweep or a ship's sound output, the several attenuated frequency bands being then mixed and applied to the mine mechanism being tested.

Another object of the invention is to provide apparatus of the above type with which it is possible to transpose at will from one parallel run to another parallel run.

This object is accomplished in accordance with the invention by employing a vector resolver wherein the average sound pressure level obtained empirically from the sound recording of a run is transposed to another parallel run along any track corresponding to a greater distance from the mine than the original run. This method assumes that the ocean bottom has cylindrical symmetry about the mine.

Other objects and many of the attendant advantages of the invention will be readily appreciated as the same becomes better understood from the following dscription when read in connection with the accompanying drawing in which:

FIG. 1 is a block diagram illustrating the preferred embodiment of the invention; and FIG. 2 is a graphic illustration of the vectors involved in a laterally displaced parallel run.

Referring to the drawing, a record medium 11 such as a magnetic tape has recorded thereon the response of a hydrophone on a channel bed to a run thereover of a ship or acoustic sweep gear, the run preferably being made directly over the hydrophone so that all runs parallel thereto can be simulated. In making the record 11 the ship is sailed at a fixed speed and the recording started at a known distance from the hydrophone. For reasons appearing below it is unnecessary to record beyond the point of nearest approach to the hydrophone.

The system shown in FIG. 1 utilizes this recorded information to plot curves corresponding to the attenuation of each of several separate frequency bands. Five frequency bands have been chosen for proper coverage of the entire frequency response band of a mine mechanism and are selected so as to be centrally located about such frequency response band. The tape 11 is fed past a suitable transducer 12 which picks up the recorded signals and feeds them through a switch 13, when in position A as shown, to give filters 14, 15, 16, 17 and 18 which pass, respectively, frequency bands $f_1$, $f_2$, $f_3$, $f_4$ and $f_5$ which are amplified by amplifiers 21, 22, 23, 24 and 25. Each amplified frequency band is connected by individual switches 26, when in position A as shown, through rectifiers 27 to the y-axes, of the recording portions of 2-axis recorder and curve followers 28 of any suitable type. The 2-axis recorders and curve followers marketed by F. L. Moseley Co. under the trademark Autograf are quite suitable for this purpose.

Simultaneously and in time relation with the reproduction of the signal from the tape 11 as above described a ship's position voltage generator 32 provides a voltage which varies directly as the ship's distance (during recording) from the point of closest approach to the recording hydrophone. The desired time relation may be obtained by a mechanical coupling 37 between the generator 32 and a roller 38 driven by or driving the tape 11. This varying voltage from the generator 32 is applied to a resolver 33 the output of which is rectified preferably by a full wave rectifier 34 and fed through a filter 35 to the X-axis of each of the recorders 28 which in a well known manner record curves individually representative of the strength versus distance and hence of the attenuation of the input signals from the rectifiers 27.

In recording the curves as above described a voltage source 31 is either disconnected from the resolver 33 or set at zero. These curves are, if not originally drawn with conducting ink, converted to a conducting medium by tracing over with conducting paint so that they may govern the followers 28 in the testing of mine mechanisms now to be described.

A record medium 41 which preferably comprises an endless loop of magnetic tape has thereon a substantially constant-level recording of the acoustic output of a ship, an acoustic sweep gear, or a combination of the two, recorded in a free field by which is meant in deep water and far from shore.

The loop record 41 is utilized in the system shown in FIG. 1 to test an acoustic mine mechanism 47 in the following manner. With the switches 13 and 26 in their positions B the loop of tape 41 is fed at a constant speed past a suitable transducer 42 which picks up the constant level signal and feeds it to the five filters 14–18. The five frequency bands passed by these filters are individually amplified in amplifiers 21–25 and fed through attenuators 44 to an amplifier 46 which mixes the several frequency bands for application to and matches the impedance of the mine mechanism 47 being investigated. The amount of attenuation imposed on each of the five frequency bands by the attenuators 44 is individually controlled by its associated curve follower 28 in strict accordance with the curve or curves prepared as above described for a particular channel. This control is accomplished by feeding the output of the resolver 33 to the curve followers 28 which are preferably mechanically coupled as by shafts 29 to the attenuators 44, the inputs to the resolver being a voltage from the generator 32 which varies as ship's position and a voltage from the generator 31 which is set at a value corresponding to the lateral distance from a mine the ship's path is to simulate and being zero for a ship's path directly over the mine. By reference to FIG. 2 it will be clear that when the ship's position voltage input corresponds to the vector P and the lateral distance voltage input corresponds to the vector L the output of the resolver 33 will represent the vector R which is the actual distance the ship is from the mine. In both curve recording and curve following the output of the resolver 33, the vector R, represents the x-axis, the y-axis being the amount of attenuation sensed in recording the curve and imposed by the curve on playback (B operation).

As was above noted it is permissible when recording an acoustic signature on the tape 11 for a particular location to record only during the approach to the hydrophone. This is so for at least two reasons, viz., (1) on playback (B operation) a mine mechanism is generally actuated or "fired" on increasing signal strength and (2) the x-axis voltage as controlled by the output of the ship's position generator 32 can be made to reverse so that the curve is followed in the reverse direction as is well known.

In recording the tape 11 it may be given a blip when starting to record and a measure of the time interval between the start and the nearest approach to the recording hydrophone noted so that in curve recording (A operation) the coupling 37 can be chosen to obtain a full x-axis excursion during the measured time interval. On playback (B operation) if the voltage from the ship's position generator 32 is varied at the same rate as during curve recording the original ship's speed will be simulated whereas a faster or slower rate of variation of the voltage from the generator 32 will simulate faster or slower ship's speed.

It is important that the frequency bands selected, whether more or less than five, be centrally located about the frequency response of the mine mechanism so as to properly cover its entire frequency response band. A set of filters from five cycles to say 100 kc of standard type and design should be available for selection as requred. For example, if the mine mechanism to be tested is primarily sensitive to a 30 cycle per second signal then the following values for $f_1$ to $f_5$ would be chosen:

$f_1$ to pass 0–10 cps
$f_2$ to pass 10–20 cps
$f_3$ to pass 20–40 cps
$f_4$ to pass 40–80 cps
$f_5$ to pass 80–160 cps In the frequency region below 1000 cps underwater sound transmission is different for different frequencies and different spatial interaction loops are produced as the frequency changes. By dividing the response band into a number of narrow bands the transmission characteristic of each narrow band can be plotted on separate curves each point of which represents the average sound pressure level at a given distance in a particular environment.

The apparatus provided by the present invention makes it possible to ascertain from a single recording on a tape 11 of the acoustic signature of a ship or noisemaker in a particular harbor or channel the safe operating distance and the safe speed of a mine sweeper approaching a mine field therein, and the optimum modulation cycle of an acoustic sweep for use in that particular harbor or channel. It will be understood in this connection that there will be available a constant level free field recording on a record medium 41 of the acoustic output of different ships, different acoustic sweep gear, and combinations thereof.

While for the purpose of disclosing the invention a single preferred embodiment thereof has been described in detail, it will be obvious to those skilled in this art that the novel features may be incorporated in a variety of embodiments without departing from the scope of the invention pointed out in the appended claims.

What is claimed is:

1. The method of producing an electric signal corresponding to the underwater acoustic signature which would be generated by the movement of a certain sound source through a remote underwater environment which comprises preparing a recording at a substantially constant signal level of the acoustic output of said certain sound source in deep water far from shore, preparing a series of curves of the transmission characteristics of said remote environment for sound in selected consecutive frequency bands as a function of distance from said source, reproducing the constant level recording as electrical waves, separating the reproduced electrical waves into said selected consecutive frequency bands, modulating the amplitude of the electrical waves in each frequency band in accordance with the corresponding sound transmission characteristic curve, and combining the modulated electrical waves.

2. Apparatus for simulating locally as an electrical signal the underwater acoustic signature which would be generated by a sound source moving through a remote mineable body of water comprising a recording medium having recorded thereon a constant-level signal corresponding to the acoustic output of said sound source in a free field, means for reproducing from said recording medium said constant level signal, means for separating the reproduced signal into a plurality of contiguous frequency bands, means controllable for individually attenuating each of said frequency bands, a plurality of means having variable parameters individually representative of the relation between distance of travel and the attenuation in said remote body of water of sound waves having the frequency of each of said bands, means coupling each of said plurality of means with its variable parameter in controlling relation to a corresponding one of said attenuating means, means for varying all of said parameters as a function of time and means for combining the said attenuated bands into a single signal.

3. Apparatus for ascertaining locally the response characteristics to an acoustic influence of an acoustic mine mechanism in a remote underwater environment comprising a plurality of records having significant dimensions individually representing the relation between distance and attenuation of sound waves in contiguous frequency bands in the remote environment, a recording medium having recorded theron a constant-level signal corresponding to the acoustic output of said acoustic influence in a free field, means for reproducing from said recording medium said constant level signal, a plurality of filtering means having different frequency response characteristics corresponding to the contiguous frequency bands represented by said records, means controlled by said records for individually attenuating the outputs of said filtering means, means for combining the attenuated outputs of said filtering means, an acoustic mine mechanism, and means for applying said combined attenuated outputs to said mine mechanism.

* * * * *